United States Patent [19]
Dean

[11] Patent Number: 5,307,642
[45] Date of Patent: May 3, 1994

[54] REFRIGERANT MANAGEMENT CONTROL AND METHOD FOR A THERMAL ENERGY STORAGE SYSTEM

[75] Inventor: William J. Dean, Grapevine, Tex.

[73] Assignee: Lennox Industries Inc., Dallas, Tex.

[21] Appl. No.: 7,234

[22] Filed: Jan. 21, 1993

[51] Int. Cl.[5] .............................................. F25D 3/00
[52] U.S. Cl. .................................... 62/59; 62/201; 62/332; 62/430
[58] Field of Search ................ 62/59, 117, 201, 430, 62/434, 332

[56] References Cited

U.S. PATENT DOCUMENTS

| | | | |
|---|---|---|---|
| 4,628,706 | 12/1986 | Neudorfer | 62/278 |
| 4,637,219 | 1/1987 | Grose | 62/199 |
| 4,809,516 | 3/1989 | Jones | 62/160 |
| 4,916,916 | 4/1990 | Fischer | 62/199 |
| 4,918,936 | 4/1990 | Sakamoto | 62/117 |
| 4,940,079 | 7/1990 | Best et al. | 165/2 |
| 4,964,279 | 10/1990 | Osborne | 62/59 |
| 5,005,371 | 4/1991 | Yonezawa et al. | 62/238.6 |
| 5,018,367 | 5/1991 | Yamada et al. | 62/476 |
| 5,042,262 | 8/1991 | Gyger et al. | 62/64 |
| 5,065,598 | 11/1991 | Kurisu et al. | 62/330 |
| 5,211,029 | 5/1993 | Uselton et al. | 62/324.5 |

*Primary Examiner*—Henry A. Bennet
*Assistant Examiner*—William C. Doerrler
*Attorney, Agent, or Firm*—Allegretti & Witcoff, Ltd.

[57] ABSTRACT

A thermal energy storage system includes a unique control arrangement to enable it to operate in three steady state operational modes, namely, ice making, direct cooling and shift cooling, as well as two transitory modes, namely hypermigration and pump out. The hypermigration mode enable the thermal energy storage system to switch into the shift cooling mode by desirably positioning the refrigerant charge in the ice module heat exchanger. The pump out mode is needed to move the refrigerant charge into the condensing unit in preparation for the direct cooling mode of operation from either the shift cooling mode or the ice making mode. The thermal energy storage permits the refrigerant charge to be in the proper location when each change in mode operation occurs.

17 Claims, 2 Drawing Sheets

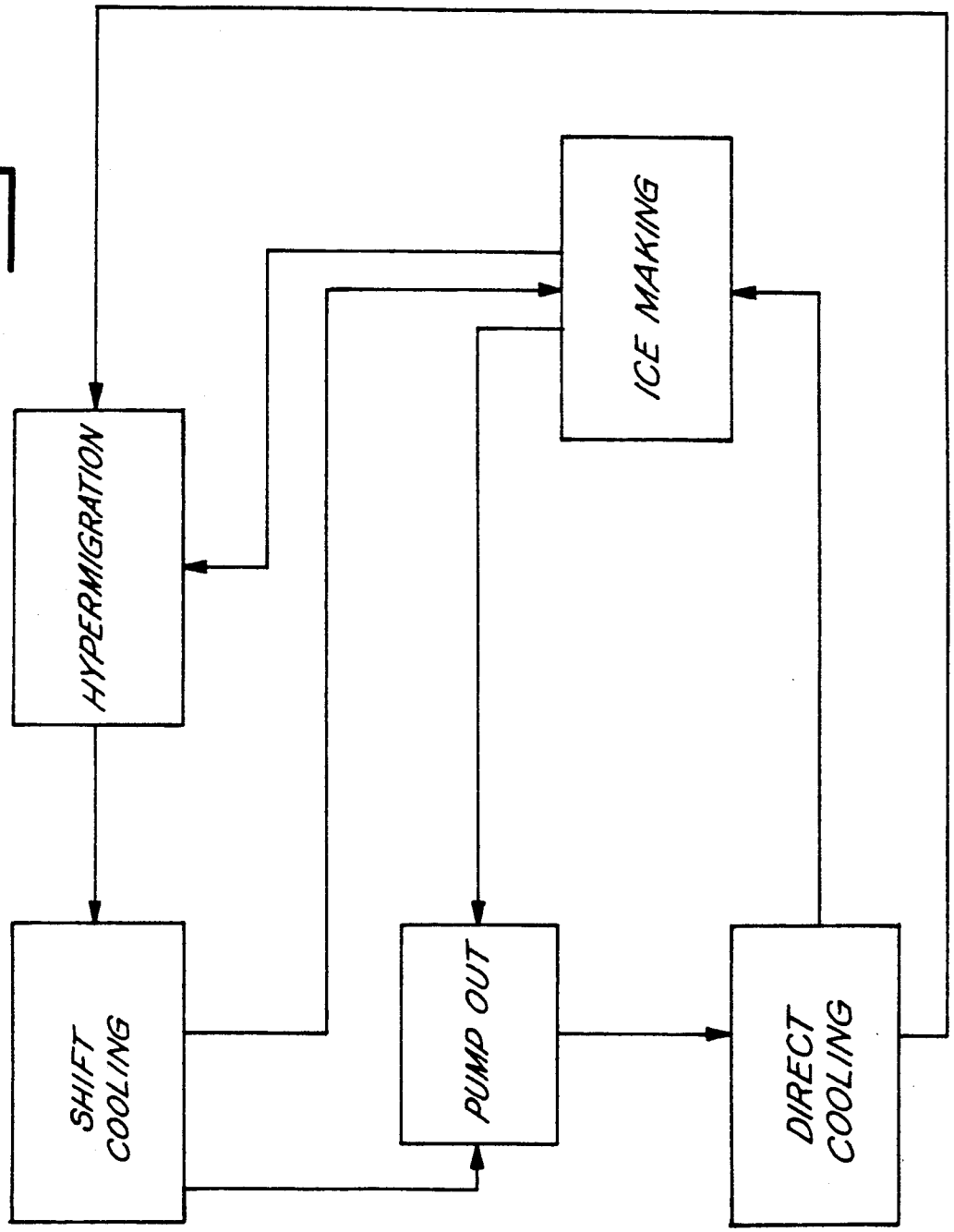

REFRIGERANT MANAGEMENT CONTROL AND METHOD FOR A THERMAL ENERGY STORAGE SYSTEM

BACKGROUND OF THE INVENTION

The present invention relates in general to a thermal energy storage system, and more particularly, to a refrigerant management control and method for a thermal energy storage system.

In the prior art, certain air conditioning apparatus with thermal energy storage were developed for the purpose of efficiently exploiting the two-tier pricing system utilized by electrical utilities. One exemplary apparatus is disclosed in U.S. Pat. No. 4,735,064 to Fischer.

By way of background, electrical utilities have developed a two-tier pricing structure which is divided into peak hours and off-peak hours. Peak hours occur when electrical demand is maximized, such as those periods of the day corresponding to the average daily highest temperatures, and which generally relate to some extent to those hours surrounding the afternoon-time period. One important reason for the relatively high extent of electrical demand during the period of the day when the temperatures are the greatest (i.e., at the "peak hours") is because of the utilization of air conditioning systems in a large percentage of commercial and residential buildings. The "off peak" hours occur when the outdoor temperatures are cooler and electrical demand is minimized. The "off peak" hours correspond generally to the night time period around and after the midnight hour, when the demand for cooling, is minimized because of the lower outdoor temperature, the relative inactivity of persons, and when the household utilization of electricity for electrical lighting is minimized.

As a result of the greater demand for electricity during the peak hours of the day, the rate prices for electricity during such peak hours are substantially greater than the rate prices for electricity during the off peak hours.

The amount of electricity utilized at business and residential buildings is substantial during peak hours as the condensing unit in the air conditioning apparatus operates to meet the cooling requirements of the building. In view thereof, it has been proposed (such as for example in U.S. Pat. No. 4,735,064 to Fischer and, U.S. Pat. No. 4,637,219 to Grose), that is would be advantageous to store energy during off peak hours and to use such stored energy during peak times to reduce the power consumption of the compressor in the condensing unit.

The prior art structures, as shown for example in the Fischer patent 4,735,064, are directed to apparatus having an insulated storage tank which contains a heat exchanger. The heat exchanger in the storage tank contains a refrigerant. A condensing unit is connected to the heat exchanger for supplying liquid refrigerant to the heat exchanger, which refrigerant upon expansion freezes or solidifies the storage material in the tank during a first time period, which corresponds to the period of off peak electrical demand. The storage medium may be water or a phase change material such as polyethylene glycol. The heat exchanger is also connected to an evaporator which receives cold refrigerant liquid from the heat exchanger in the storage tank during a second time period, which corresponds to the period of peak electrical demand. In addition, the condensing unit is typically connected to the evaporator by means of conduits passing through the storage tank, and thus provides refrigerant to the evaporator during a third time period, when some cooling may be necessary. This third time period occurs during off peak hours. Energy use and operating cost are reduced by operating to provide cooling in this way during off peak hours.

One problem with such prior art structure is that there is melting of some of the ice in the storage tank when the thermal energy storage system is operated during the third time period. Further, operation has proved to be less than optimally efficient due to low evaporating temperature in the direct cooling mode and due to low evaporating temperature operation in the ice making mode to re-make the ice which has been melted during the direct cooling mode operation. Thus, there is an "energy penalty" associated with cooling by the freezing and melting of ice as compared to conventional air conditioning methods involving direct pumping of refrigerant from the condenser of the condensing unit to the evaporator.

An improvement in such prior art is provided by the structures disclosed in application Ser. No. 07,706,057 filed May 28, 1991, and entitled Combined Multi-Modal Air Conditioning Apparatus and Negative Energy Storage System. The said application, which is assigned to the same assignor as the present case, discloses a system which permits optimally efficient operation by means of by-passing of the storage tank by the circulating refrigerant when the apparatus is in the direct-cooling mode, thereby to avoid melting the stored negative heat energy storage medium, usually comprising water which then does not have to be refrozen. The combined multimodal air conditioning apparatus and negative energy storage system can be operated in a direct cooling mode, an ice making mode and a shift cooling mode to provide improved operating cost efficiency over prior art systems such as that of Fischer 4,735,064. In the direct cooling mode, the ice storage tank is isolated from the refrigeration system. In the ice making mode, the heat exchanger in the storage tank functions as the evaporator in the refrigeration system. Heat is removed from the storage medium. If the storage medium is water, it will solidify and form ice. In the shift cooling mode, the condensing unit is effectively isolated from the storage tank and the evaporator and a liquid pump circulates refrigerant between the heat exchanger in the storage tank and the evaporator.

Neither the known thermal energy storage systems nor the systems disclosed in the copending application Ser. No. 07/706,057 filed May 28, 1991 have not taken into account providing the proper refrigerant change for each mode of operation. The problem was to provide the proper refrigerant charge where it needs to be in each mode of operation and to be able to transport the refrigerant charge to its new location in the system when a switch in mode operation occurs.

An object of the present invention is to provide a thermal energy storage system or TES system with improved refrigerant charge management control and method.

Another object of this invention is to provide a thermal energy storage system operable in direct cooling, ice making and shift cooling steady state modes with two transitory modes that allow for proper control of the refrigerant charge.

Yet another object of this invention is to provide a thermal energy storage system having direct cooling, ice making and shift cooling steady state modes with a hypermigration mode prior to shift to shift cooling and a pump out mode prior to shift to direct cooling in order to properly locate the refrigerant charge in the TES system prior to initiation of each of these steady state modes of operation. Other objects and advantages of the present invention will be made more apparent hereafter.

BRIEF DESCRIPTION OF THE DRAWING

There is shown in the attached drawing a presently preferred embodiment of the present invention, wherein

FIG. 2 is a schematic drawing illustrating the operating sequence of the various modes of operation of the thermal energy storage system of FIG. 1.

DETAILED DESCRIPTION OF THE PRESENT INVENTION

Figure 1:
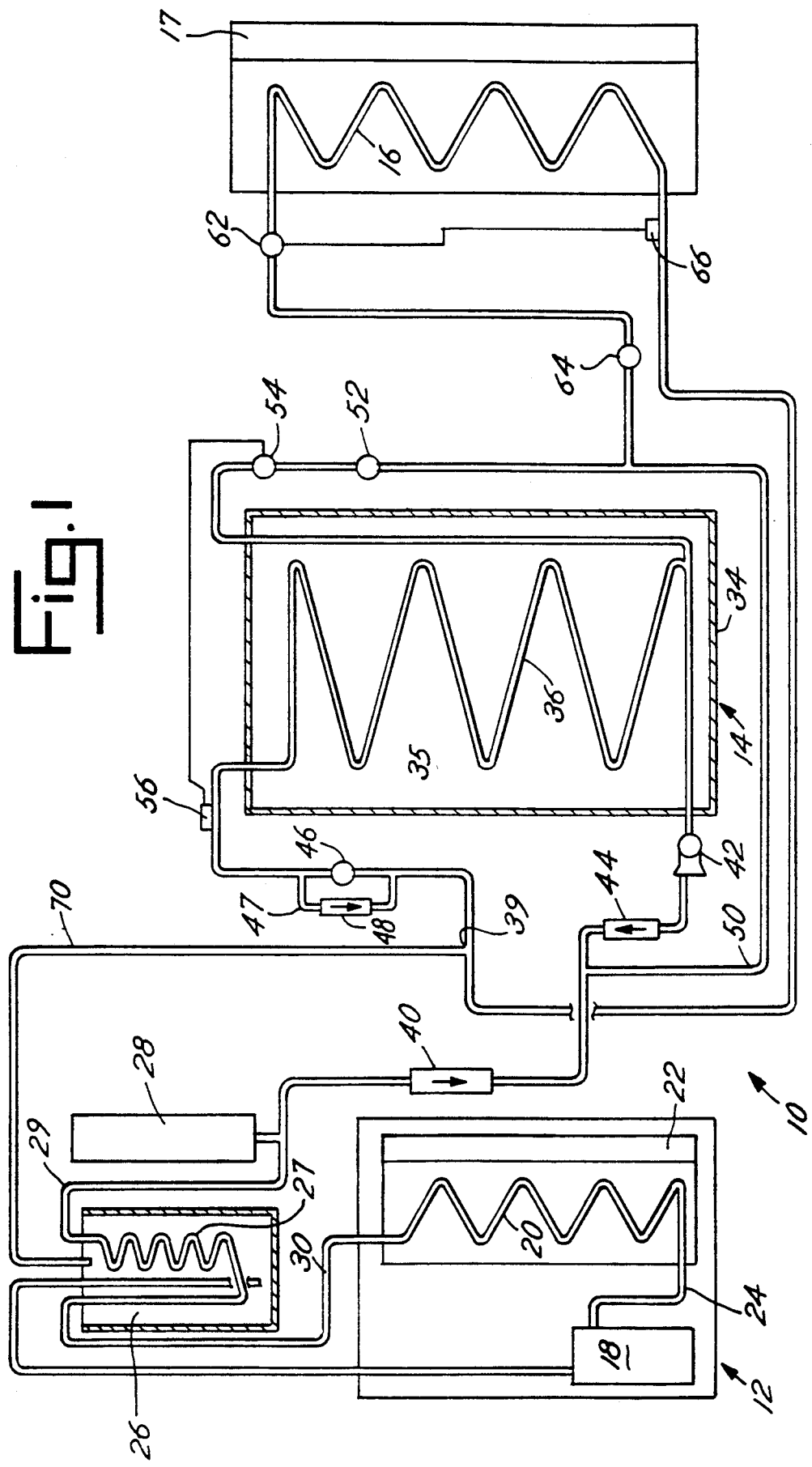
FIG. 1 is a schematic view of the new thermal energy storage system incorporating a unique refrigerant charge control arrangement to accommodate the refrigerant requirements of each steady state mode of system operation.

There is shown in FIG. 1 a unique thermal energy storage system (TES system) which is operable in three distinct modes, namely, ice making, direct cooling and shift cooling, as well as two transitory modes, that allow for the proper control of the refrigerant charge and provide almost instantaneous changeover between operating modes while protecting all components of the TES system.

The TES system 10 includes a condensing unit 12, an ice module 14 and an evaporator 16. The condensing unit comprises a compressor 18, a condenser 20 and an outdoor fan 22 associated with the condenser 20 for passing air thereover. The condenser 20 is a heat exchanger or coil of known design. Refrigerant line 24 connects the compressor 18 to the heat exchanger coil or condenser 20.

Also included in the TES system 10 are an accumulator 26 and a liquid receiver 28. Accumulator 26 includes a liquid line to suction gas heat exchanger 27. Refrigerant line 30 extends from the condenser 20 to heat exchanger 27 in the accumulator 26. Refrigerant line 29 connects heat exchanger 27 to the ice module 14. Liquid receiver 28 is connected at its lower end to refrigerant line 29.

The ice module 14 comprises an insulated storage tank 34 for an energy storage medium 35, such as water, a heat exchanger coil 36 in said storage tank 34 connected at one end to refrigerant line 29 and at the other end to refrigerant line 38.

Disposed in refrigerant line 29 is a liquid line check valve 40 for preventing flow of refrigerant from the ice module heat exchanger 36 to the liquid receiver 28 or accumulator 26 while the liquid pump 42 is operating. Also disposed in line 29 are a liquid pump 42 and a liquid pump check valve 44. The liquid pump check valve 44 will permit refrigerant flow in the direction of the arrow, but will prevent refrigerant flow in the opposite direction. Thus, liquid pump check valve 44 will prevent refrigerant from the condensing unit 12 and the liquid receiver 28 from reaching the liquid pump 42 and heat exchanger 36.

Suction line valve means are provided for controlling flow between the ice module 14 and the condensing unit 12. The suction line valve means may include suction valve 46 and suction line check valve 48. Suction line valve 46, which is provided in line 38, functions in an on-off fashion. The suction line valve 46 may be a solenoid valve. Disposed in parallel relationship to the suction line valve 46 in line 47 is a suction line check valve 48. Suction line check valve 48 will permit refrigerant flow in the direction of the arrow, and preclude flow in the opposite direction. The schematic shows separate valves for 46 and 48, however, it will be understood that the valves could be incorporated into a single valve body and perform the same function.

Refrigerant line 50 is connected at one end to line 29 between liquid line check valve 40 and liquid pump check valve 44. At its other end refrigerant line 50 connects to the ice module heat exchanger 36. Provided in refrigerant line 50 are an ice making valve 52 and expansion means 54. The ice making valve 52 functions in an on-off fashion and is preferably a solenoid valve. The expansion means 54 may comprise a conventional thermal expansion valve having a sensor 56 in heat transfer relationship with line 38 for appropriately controlling flow of refrigerant to the ice module heat exchanger 36 in the storage tank 34.

Line 38 extends from suction line valve 46 to the lower end of evaporator 16 as shown in FIG. 1. Line 60 connects the upper end of evaporator 16 to the line 50. Line 60 communicates with line 50 between the end connected to line 29 and the ice making valve 52. Provided in line 60 are expansion means 62 and liquid line valve 64. The expansion means 62 comprises a conventional thermal expansion valve having a sensor 66 in heat transfer relationship with line 38 for appropriately controlling the flow of refrigerant to the evaporator. The evaporator 16 is generally associated with a fan or blower section 17 comprising one or more fans for moving air to be treated over the evaporator.

A refrigerant line 70 is connected at one end to line 38 and at the other end to the interior of accumulator 26 adjacent the top thereof. A line 72 extends into the accumulator 26 adjacent the bottom thereof and is connected to the compressor 18. Lines 70 and 72 are part of the suction line means for returning refrigerant to the compressor.

The TES system 10 is intended to operate in three distinctly different steady state modes, namely, ice making, direct cooling, and shift cooling, as well as two transitory modes that allow for the proper control of the refrigerant charge in each of the steady state modes.

In the ice making mode of operation, the TES system 10 functions as a direct expansion single stage refrigerant cycle. The ice module heat exchanger 36 functions as an evaporator and the evaporator 16 is isolated from the remainder of TES system 10. Refrigerant is prevented from entering evaporator 16 by the closure of liquid line valve 64. Liquid refrigerant is prevented or blocked from entering the ice module tank 34 through the liquid pump 42 by the liquid pump check valve 44. Any refrigerant in the evaporator 16 will be drawn to the accumulator 26 through the suction line means namely, lines 38 and 70. Operation in the ice making mode is accomplished by opening ice making valve 52 and operating compressor 18. Thermal expansion valve 54 will operate to properly control the flow of refrigerant to the ice module heat exchanger 36. The extra charge of refrigerant in this mode of operation is stored in the liquid receiver 28.

In the direct cooling mode of operation, the ice module heat exchanger 36 is isolated and the TES system 10 operates as a conventional single stage direct expansion refrigerant system. Operation in the direct cooling mode is accomplished by opening the liquid line valve 64 and running the condensing unit 12 (comprising compressor 18 and condenser 20) with the evaporator 16. Isolation of the ice module or storage tank 14 is accomplished by the liquid pump check valve 44, the suction line check valve 48, and the closure of the suction line valve 46 and the ice making valve 52. The valves 46 and 48 are preferably solenoid actuated valves operated by a suitable control. The extra refrigerant charge in this mode of operation is stored in the liquid receiver 28. It is observed that before direct cooling can occur, a pump out is required to move refrigerant into the condensing unit 12. The pump out transitory mode of operation will be discussed later.

In the shift cooling mode of operation, the liquid pump 42 is on, the evaporator blower 17 is operating and the liquid line valve 64 and the suction line valve 46 are open. At this time, ice making valve 52 is closed. The liquid pump 42 will pump refrigerant from the ice module heat exchanger 36 through liquid pump check valve 44 in the direction of the arrow, through line 50, liquid line valve 64, line 60, and thermal expansion valve 62 to evaporator 16. Refrigerant will be returned from the evaporator to the ice module heat exchanger 36 via line 38 and suction line valve 46. It is to be observed that before the shift cooling mode can occur, a hypermigration transitory mode of operation is required to move refrigerant to the ice module heat exchanger 36. The hypermigration mode of operation will be discussed later.

A feature of this invention is the hypermigration mode of operation which enables the TES system 10 to switch into the shift cooling mode and the means for accomplishing the desired operation. Prior to the present invention, there appears to have been no recognition of the need for properly managing and controlling the refrigerant charge in the system for each steady state mode of operation. This invention addresses that problem in a unique fashion. In the hypermigration mode, the ice module heat exchanger 36 is utilized as a heat sink at about 32° F. Refrigerant within the ice module heat exchanger 36 condenses and the pressure within decreases. Refrigerant throughout the rest of the TES system 10 is at a much higher pressure and temperature. Thus, the refrigerant charge is drawn into the ice module heat exchanger 36 and is condensed.

The hypermigration cycle takes a relatively short time, about three minutes. The ice making valve 52, the liquid line valve 64 and the suction line valve 46 are open during the hypermigration cycle. The condensing unit 12 is off and compressor 18 is not operating.

Another feature of this invention is the pump out mode of operation and the means for accomplishing the desired operation. For direct cooling, the TES system 10 requires refrigerant in the compressor 18, condenser 20 and evaporator 16. Refrigerant charge will tend to accumulate in the ice module heat exchanger 36, since that is the coldest part of the system. In the pump out mode change from shift cooling or ice making, the ice making valve 52 and the liquid line valve 64 are closed and the condensing unit 12 is on. With the valves 52 and 64 closed, the refrigerant is blocked on the high side of the refrigeration system. The compressor 18 continues to run until the suction pressure drops below a predetermined value, presently 20 psig in a current prototype system. The pump out mode of operation allows for almost all of the refrigerant in the ice module heat exchanger 36 to be pulled into the condensing unit 12 and liquid receiver 28 via suction line valve 46, line 38, line 70, accumulator 26 and line 72.

Referring to FIG. 2, there is shown a schematic of the modes of TES system operation. With respect to the steady state modes, it is possible to go directly from the direct cooling mode to the ice making mode or from the shift cooling mode to the ice making mode. However, to go from either the direct cooling mode or the ice making mode to the shift cooling mode, it is necessary to go through the hypermigration mode. To go from the shift cooling mode or the ice making mode to the direct cooling mode, it is necessary to go through the pump out mode. The TES system of the present invention permits the refrigerant charge to be in the proper location in the TES system when each change in mode operation occurs so as to enable almost instantaneous change from one mode to another without damage to operating components in the TES system. It will be noted that if the thermal energy storage system 10 is shut off, the user can control the system so as to go directly to the ice making mode or to the direct cooling mode, but that to shift to the shift cooling mode it is necessary to go to the hypermigration mode first.

It will be understood that modifications may be made to the system 10 without departing from the spirit of the invention. For example, the line 38 may be separated at tee connection 39 and the portion to the left of the tee connection may be directly connected to the line 72 between the compressor 18 and the accumulator 26. The suction gas returning from evaporator 16 would bypass the line 70 and accumulator 26 and return to the compressor 18 via suction line portion 72.

While I have shown a presently preferred embodiment of the present invention, it will be apparent that modifications may be made to the invention within the scope of the following claims.

I claim:

1. A thermal energy storage system comprising a condensing unit, an ice module and an evaporator, liquid line means connecting said condensing unit to said ice module and to said evaporator and suction line means connecting said evaporator and said ice module to said condensing unit, first thermal expansion means for controlling the flow of refrigerant to said ice module, second thermal expansion means for controlling the flow of refrigerant to said evaporator, liquid line valve means for selectively blocking flow of refrigerant from the condensing unit to the second thermal expansion means, ice making valve means for selectively blocking flow of refrigerant from the condensing unit to the first thermal expansion means, liquid line check valve means in the liquid line means for permitting refrigerant flow from the condensing unit toward the ice module and evaporator, but preventing flow in the opposite direction, suction line valve means between the ice module and the condensing unit for opening and closing the suction line means, and for permitting flow of refrigerant from the ice module to the condensing unit, but preventing flow in the opposite direction, a liquid pump means in the liquid line means between the condensing unit and the ice module, a liquid pump check valve means in the liquid line means between the liquid line check valve means and the liquid pump for preventing reverse flow through the liquid pump means, a liquid receiver communicating with the liquid line means between the condensing unit and the liquid line check valve means, and an accumulator disposed in the suction line means and receiving therein a portion of the liquid line means, the liquid line means including a first line connecting the condensing unit to the ice module, with said liquid line check valve means, said liquid pump check valve means and said liquid pump being disposed in said first line.

2. A thermal energy storage system as in claim 1 wherein the suction line valve means, the ice making valve means and the liquid line valve means are on-off valves.

3. A thermal energy storage system as in claim 1 wherein the first and second expansion means each comprise thermal expansion valves.

4. A thermal energy storage system as in claim 1 wherein the liquid line means includes a second line connected at one end to the first line between the liquid line check valve means and the liquid pump check valve means and communicating at the other end to the ice module, with said ice making valve and said first thermal expansion means being disposed in said second line.

5. A thermal energy storage system as in claim 4 wherein the suction line means includes a third line connecting the ice module to the accumulator and a fourth line connecting the accumulator to the condensing unit.

6. A thermal energy storage system as in claim 5 wherein the suction line valve means is disposed in the third line between the ice module and the accumulator and the liquid receiver communicates with the third line.

7. A thermal energy storage system as in claim 6 wherein the suction line means includes a fifth line connected at one end to the third line and at the other end to the evaporator.

8. A thermal energy storage system as in claim 7 wherein the liquid line means includes a sixth line connected at one end to the second line and at the other end to the evaporator, with the liquid line valve means and the second thermal expansion means being disposed in the sixth line.

9. A thermal energy storage system as in claim 1 wherein the condensing unit comprises a compressor and a condenser.

10. A thermal energy storage system as in claim 1 wherein the suction line valve means includes a suction line valve and a suction line check valve in parallel flow relationship with the suction line valve.

11. The method of operating the thermal energy storage system of claim 8 in an ice making mode by isolating the evaporator and using the ice module as an evaporator, with extra refrigerant charge being stored in the liquid receiver, comprising the steps of operating the thermal energy storage system in a direct cooling mode by isolating the ice module and using the evaporator with the condensing unit, operating in a shift cooling mode by isolating the condensing unit, accumulator and liquid receiver and actuating the liquid pump to pass refrigerant between the ice module and the evaporator, operating in a hypermigration mode to allow the system to switch into the shift cooling mode by using the ice module as a heat sink to draw the refrigerant charge to the ice module where it is condensed and operating in a pump out mode prior to shift to the direct cooling mode by isolating the ice module and evaporator and operating the condensing unit to cause refrigerant charge to be pulled into the liquid receiver and condensing unit.

12. A thermal energy storage system comprising a compressor, condenser, ice module and evaporator operatively connected together by refrigerant lines, said ice module including a heat exchanger, an accumulator, a portion of the first refrigerant line connecting the condenser and the ice module heat exchanger being disposed in the accumulator, a liquid check valve in the refrigerant line between the accumulator and the ice module heat exchanger for preventing flow of refrigerant from the ice module heat exchanger to the portion of the refrigerant line disposed in the accumulator, but permitting refrigerant flow in the opposite direction, a liquid pump in said refrigerant line between the accumulator and the ice module heat exchanger, a liquid pump check valve for preventing flow of refrigerant to the liquid pump, but permitting refrigerant flow in the opposite direction, a liquid receiver communicated to the first refrigerant line, a second refrigerant line connected at one end to the first refrigerant line between the liquid line check valve and the liquid pump check valve and connected at the other end to the ice module heat exchanger, an ice making valve in said second refrigerant line, thermal expansion means in said second refrigerant line, a third refrigerant line connecting the ice module heat exchanger to the accumulator, and a fourth refrigerant line communicating the accumulator to the compressor, the third and fourth refrigerant lines comprising suction line means, a suction line valve in said suction line means, a suction line check valve in parallel connection with said suction line valve for permitting flow from the ice module heat exchanger to the accumulator, but preventing flow in the opposite direction, a fifth refrigerant line connected at one end to the third refrigerant line between the accumulator and the suction line valve and connected at the other end to the evaporator, a sixth refrigerant line connecting the evaporator to the second refrigerant line, expansion means and a liquid line valve in said sixth refrigerant line, said thermal energy storage system operating in an ice making mode by opening the ice making valve and closing the liquid line valve in said sixth refrigerant line, said thermal energy storage system operating in a direct cooling mode by opening the valve in said sixth refrigerant line and closing the ice making valve, the ice module heat exchanger being isolated by closing the ice making valve and the suction line valve, with the suction line check valve and liquid pump check valve preventing flow to the ice module heat exchanger, said thermal energy storage system operating in a shift cooling mode by actuating the liquid pump, with the liquid line valve in the sixth refrigerant line and the suction line valve being open, said thermal energy storage system operating in a hypermigration mode to enable the thermal energy storage system to switch into the shift cooling mode, the compressor being off in the hypermigration mode and the liquid line valve in the sixth refrigerant line, the ice making valve and the suction line valve being open, and said thermal energy storage system operating in a pump down mode by closing the ice making valve and the liquid line valve in the sixth refrigerant line and actuating the compressor so that almost all refrigerant in the ice module heat exchanger is drawn into the condenser and liquid receiver.

13. A thermal energy storage system as in claim 12 wherein the ice making valve is a solenoid valve.

14. A thermal energy storage system as in claim 12 wherein the suction line valve is a solenoid valve.

15. A thermal energy storage system as in claim 12 wherein the suction line valve is in the third refrigerant line.

16. A method of operating a thermal energy storage system comprising a compressor, a condenser, an accumulator, a liquid receiver, an ice module, a liquid pump associated with the ice module, expansion means and an evaporator operatively interconnected comprising the selected steps of (1) operating the thermal energy storage system in an ice making mode by isolating the evaporator and utilizing the ice module as an evaporator, with extra refrigerant charge being stored in the liquid receiver; (2) operating the thermal energy storage system in a direct cooling mode by isolating the ice module and using the evaporator in its normal manner; (3) operating the thermal energy storage system in a shift cooling mode by isolating the compressor, condenser, accumulator and liquid receiver and actuating the liquid pump to pass refrigerant between the interconnected ice module and evaporator; (4) operating the thermal energy storage system in a hypermigration mode to allow the system to switch into the shift cooling mode by using the ice module as a heat sink to draw the refrigerant charge to the ice module where it is condensed, and (5) operating the thermal energy storage system in a pump out mode prior to shift to the direct cooling mode by isolating the ice module and evaporator and operating the compressor and causing the refrigerant charge to be pulled into the condenser and liquid receiver.

17. A thermal energy storage system comprising a compressor, a condenser, a receiver for storing liquid refrigerant, an ice module, a liquid refrigerant pump associated with the ice module, expansion means, and an evaporator operatively interconnected, said system further comprising:

first isolation means for isolating the evaporator to allow the system to operate in an ice making mode, wherein the ice module is utilized as an evaporator, excess liquid refrigerant being stored in the receiver when the system is operated in the ice making mode;

second isolation means for isolating the ice module to allow the system to be operated in a direct cooling mode, wherein the evaporator is utilized in its normal manner, excess liquid refrigerant being stored in the receiver when the system is operated in the direct cooling mode;

third isolation means for isolating the compressor, condenser and receiver to allow the system to be operated in a shift cooling mode, wherein the ice module is utilized as a condenser, said system further including means for actuating the liquid refrigerant pump to circulate refrigerant between the ice module and evaporator;

interconnection means for temporarily interconnecting the condenser, receiver, ice module and evaporator to allow the system to be operated in a first transitory mode, wherein the compressor and the liquid refrigerant pump are off and the ice module is utilized as a heat sink to draw refrigerant from the condenser, receiver and evaporator into the ice module, the system being operated in the first transitory mode before the system is operable in the shift cooling mode; and fourth isolation means for temporarily inhibiting the flow of refrigerant to the ice module and evaporator to allow the system to be operated in a second transitory mode, wherein the compressor is operated to draw refrigerant into the condenser and receiver, the system being operated in the second transitory mode before the system is operable in the direct cooling mode.

\* \* \* \* \*